US011212411B2

(12) United States Patent
Ikeda et al.

(10) Patent No.: US 11,212,411 B2
(45) Date of Patent: Dec. 28, 2021

(54) INFORMATION PROCESSING APPARATUS, INFORMATION PROCESSING METHOD AND NON-TRANSITORY RECORDING MEDIUM

(71) Applicants: Yuji Ikeda, Kanagawa (JP); Takahiro Akatsu, Tokyo (JP)

(72) Inventors: Yuji Ikeda, Kanagawa (JP); Takahiro Akatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/911,538

(22) Filed: Jun. 25, 2020

(65) Prior Publication Data

US 2021/0021728 A1  Jan. 21, 2021

(30) Foreign Application Priority Data

Jul. 16, 2019  (JP) .............................. JP2019-130990
Sep. 12, 2019  (JP) .............................. JP2019-166360
Jan. 7, 2020  (JP) .............................. JP2020-000789

(51) Int. Cl.
*H04N 1/00* (2006.01)
*G06F 9/4401* (2018.01)

(52) U.S. Cl.
CPC ....... *H04N 1/00928* (2013.01); *G06F 9/4411* (2013.01); *H04N 1/00408* (2013.01)

(58) Field of Classification Search
CPC combination set(s) only.
See application file for complete search history.

(56) References Cited

U.S. PATENT DOCUMENTS

| 2013/0120784 A1* | 5/2013 | Takagi | H04N 1/00912 |
| | | | 358/1.14 |
| 2013/0321834 A1* | 12/2013 | Suzuki | G06F 3/1293 |
| | | | 358/1.13 |
| 2016/0089917 A1* | 3/2016 | Kanda | B41J 29/38 |
| | | | 358/1.8 |
| 2017/0099406 A1 | 4/2017 | Odaira | |

FOREIGN PATENT DOCUMENTS

| JP | 11-065376 | 3/1999 |
| JP | 2004-159046 | 6/2004 |

OTHER PUBLICATIONS

Extended European Search Report dated Dec. 16, 2020.

* cited by examiner

*Primary Examiner* — Helen Zong
(74) *Attorney, Agent, or Firm* — Harness, Dickey & Pierce, P.L.C.

(57) ABSTRACT

An information processing apparatus, an information processing method, and a non-transitory recording medium. The information processing apparatus receives an initialization instruction from an external apparatus, initializes second information among first information and the second information stored in a first memory in response to the initialization instruction, notifies the external apparatus of completion of initialization of the second information, and initializes the first information after the completion of initialization of the second information is notified to the external apparatus.

18 Claims, 15 Drawing Sheets

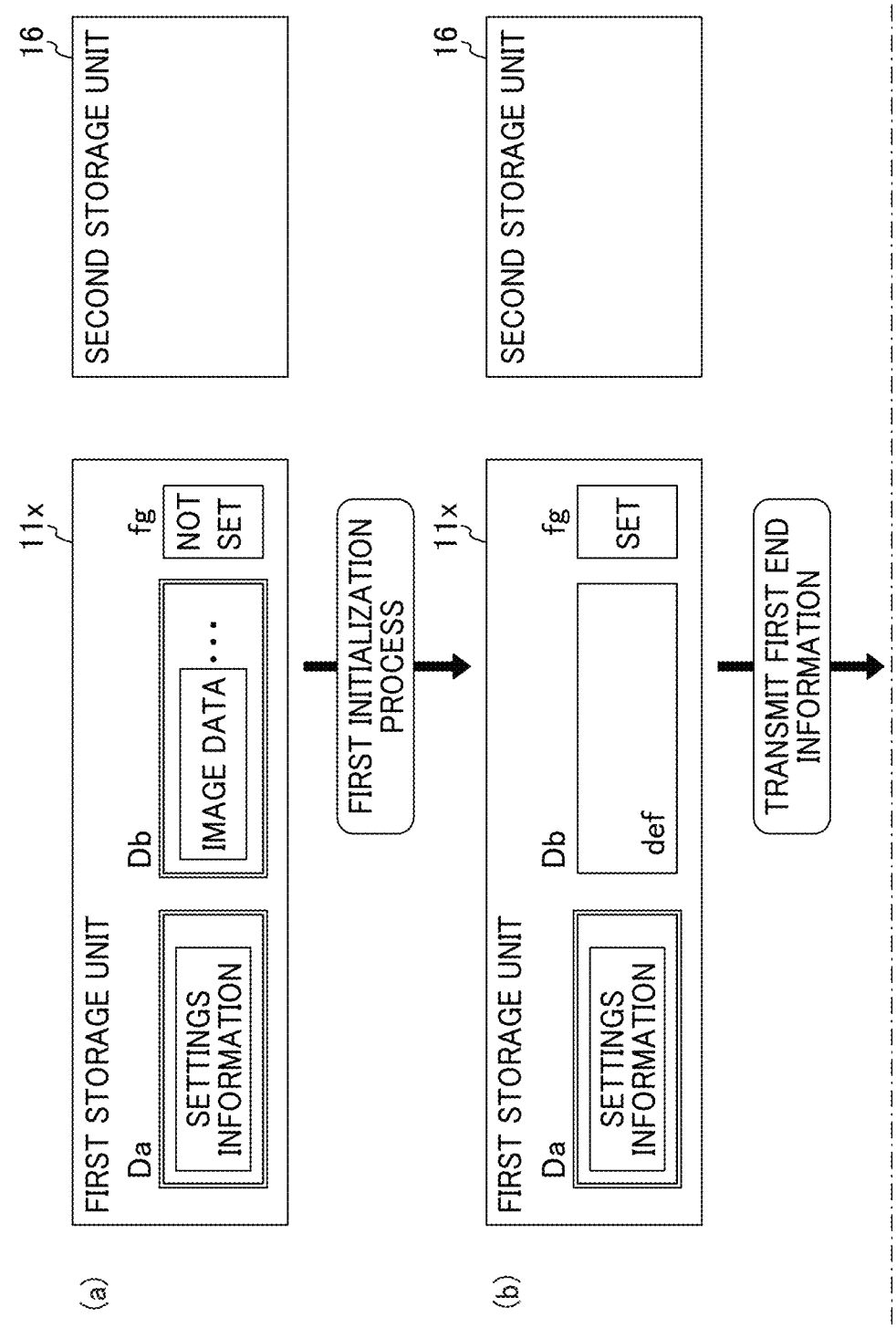

FIG. 13A

Memory Erase Report

Serial No.: 3138MA00D10
Date and Time: December 19, 2018 10:07

| Model Name | IM C5500 |
|---|---|
| Execution Date and Time | December 18, 2018 20:28 |
| HDD1 Serial Number | 98KGT24CT |
| HDD2 Serial Number | N/A |
| Erasing Method | DoD |
| Report Times | N/A |
| Result | Success |
| Network Deletion | Success |

FIG. 13B

Memory Erase Report

Serial No.: 3138MA00D10
Date and Time: December 19, 2018 10:07

| Model Name | IM C5500 |
|---|---|
| Execution Date and Time | December 18, 2018 20:28 |
| HDD1 Serial Number | 98KGT24CT |
| HDD2 Serial Number | N/A |
| Erasing Method | DoD |
| Report Times | N/A |
| Result | Success |
| Network Deletion | Unexecuted |

INFORMATION PROCESSING APPARATUS, INFORMATION PROCESSING METHOD AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2019-130990, filed on Jul. 16, 2019, No. 2019-166360, filed on Sep. 12, 2019, and No. 2020-000789, filed on Jan. 7, 2020 in the Japan Patent Office, the entire disclosure of which is hereby incorporated by reference herein.

BACKGROUND

Technical Field

The present disclosure relates to an information processing apparatus, an information processing method, and a non-transitory recording medium.

Background Art

Conventionally, a technique for initializing information in a storage unit included in an information processing apparatus has been known. In such conventional technique, an information processing apparatus receives an initialization instruction from an external apparatus. When the initialization instruction is received by the information processing apparatus, the information stored in the storage unit included in the information processing apparatus is initialized.

Further, in the above-described technique, when each piece of information of the information processing apparatus (storage unit) is initialized, a notification may be issued to the external apparatus.

SUMMARY

Embodiments of the present disclosure describe an information processing apparatus, an information processing method, and a non-transitory recording medium. The information processing apparatus receives an initialization instruction from an external apparatus, initializes second information among first information and the second information stored in a first memory in response to the initialization instruction, notifies the external apparatus of completion of initialization of the second information, and initializes the first information after the completion of initialization of the second information is notified to the external apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 9A and 9B are diagrams illustrating a specific example of the initialization process according to the third embodiment;

FIGS. 13A and 13B are diagrams illustrating end information in a modified example.

Figure 1:
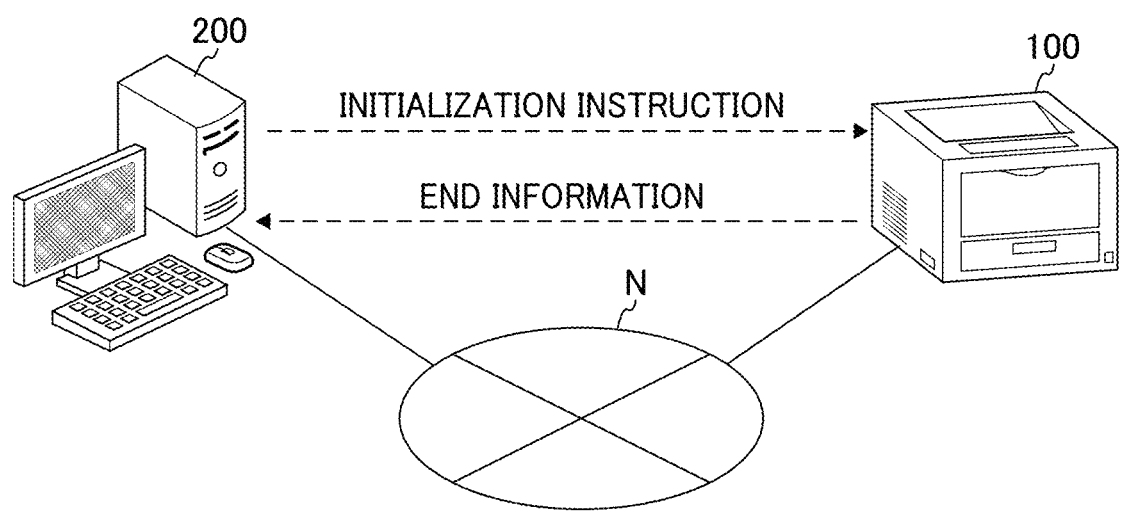
FIG. 1 is a diagram illustrating an information processing system including a multifunction peripheral (MFP) as an example of an information processing apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

FIG. 1 is a diagram illustrating an information processing system including an MFP 100 as an example of an information processing apparatus.

In the above information processing system, the MFP 100 and an external apparatus 200 communicates through a network N. In a configuration described above, for example, data in HyperText Markup Language (HTML) format is transmitted and received by HyperText Transfer Protocol (HTTP) communication. However, other communication methods and the like may be used.

The network N may be, for example, any of the internet, a dedicated network, a virtual private network (VPN), and a local network. Further, a combination of the above networks may be used. Further, any of wired communication and wireless communication may be adopted.

As illustrated in FIG. 1, the external apparatus 200 transmits an initialization instruction to the MFP 100. The initialization instruction is an instruction for initializing information stored in a storage unit (such as a hard disk (HD) 109 described below) included in the MFP 100. The above-described initialization instruction is transmitted to the MFP 100, for example, in response to an operation of the external apparatus 200.

In response to receiving the initialization instruction from the external apparatus 200, the MFP 100 executes an initialization process (remote initialization process described below) in which information stored in the storage unit is initialized. Further, the initialization process (normal initialization process described below) is also executed by directly operating the MFP 100. Hereinafter, initializing the information stored in the storage unit included in the MFP 100 (information processing apparatus) may be simply described as "initializing the MFP 100 (information processing apparatus)".

In the configuration of the present embodiment, the MFP 100 can be initialized from the installation location of the external apparatus 200. Therefore, initialization is facilitated compared with a configuration in which there is no initialization method other than direct operation of the MFP 100. For example, when changing the installation location of the MFP 100, the administrator of the MFP 100 may operate the external apparatus 200 to initialize the MFP 100.

When executing the initialization process, MFP 100 transmits end information (completion information) for notifying the external apparatus 200 of completion of the initialization process. In the end information according to the present embodiment, for example, a message indicating that the initialization has been completed, identification information of the initialized MFP 100 (model name, etc.), a date and time when the initialization is executed, and initialized information are included. However, as long as completion of the initialization is notified, contents of information notified by the end information may be changed.

The storage unit of the MFP 100 stores settings information (first information) used for communication with the external apparatus 200. The above settings information is, for example, an internet protocol (IP) address, a default gateway, and domain name system (DNS) server of the external apparatus 200.

When the MFP 100 is initialized, it may be preferable that the above-described settings information is initialized. However, if all information including the settings information is initialized at once, communication with the external apparatus 200 becomes impossible. As a result, the above-described end information is not transmitted to the external apparatus 200 after the initialization.

In the present embodiment, when the MFP 100 is initialized, information including the settings information is initialized and the end information is transmitted to the external apparatus 200. As described below in detail, when the MFP 100 is initialized, information (second information) other than the settings information is initialized first, and the end information for notifying completion of the initialization is transmitted to the external apparatus 200 according to the present embodiment. In the above configuration, the settings information is initialized after the end information is transmitted (refer to FIG. 4 described below).

Figure 2:
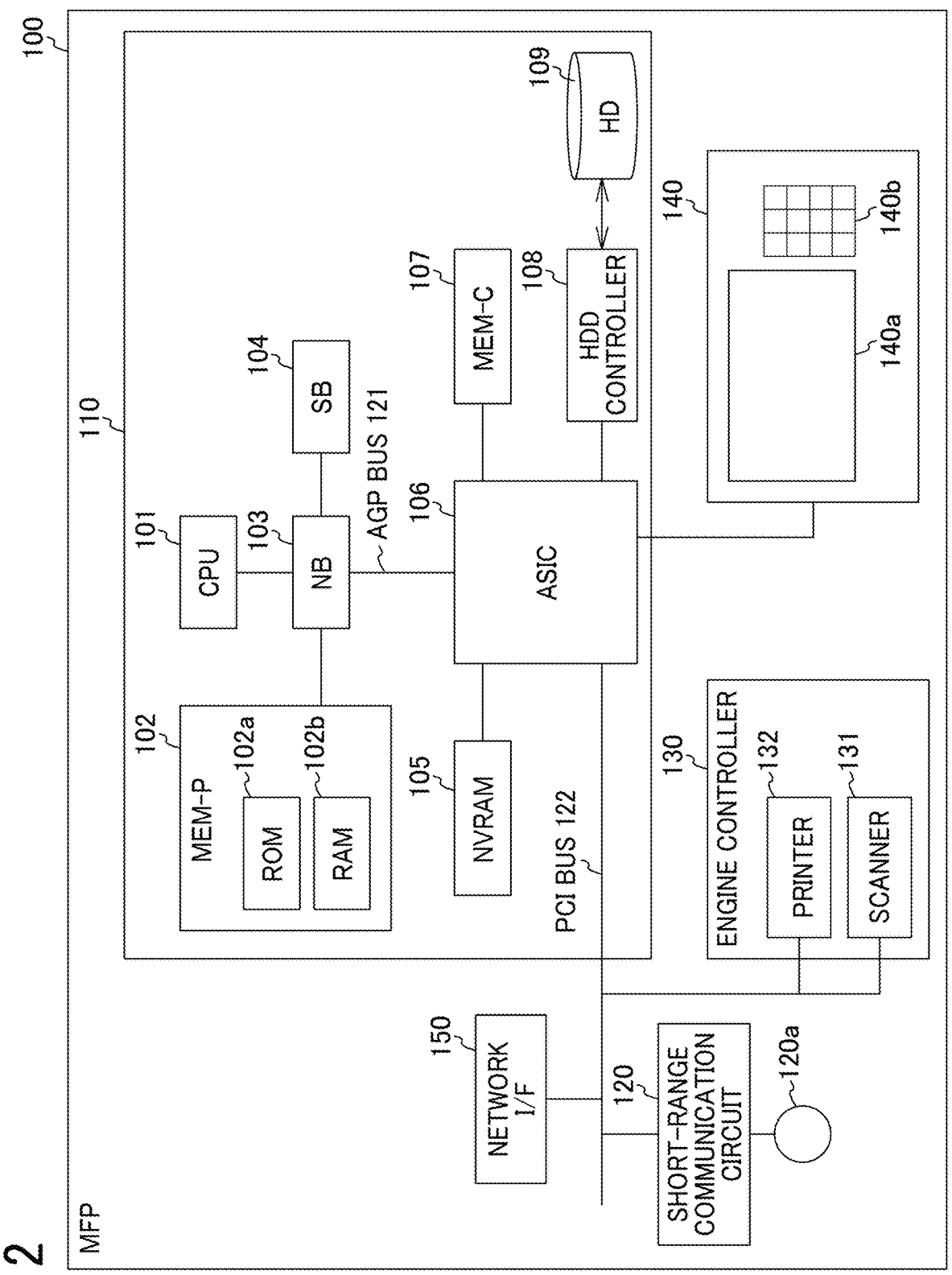
FIG. 2 is a block diagram illustrating a hardware configuration of the MFP as an example of the information processing apparatus.

FIG. 2 is a hardware configuration diagram of the MFP 100 according to the embodiment. As illustrated in FIG. 2, the MFP 100 includes a controller 110, a short-range communication circuit 120, an engine controller 130, a control panel 140, and a network interface (I/F) 150.

The controller 110 includes a central processing unit (CPU) 101 as a main part of a computer, a system memory (MEM-P) 102, a north bridge (NB) 103, a south bridge (SB) 104, an application specific integrated circuit (ASIC) 106, and a local memory (MEM-C) 107, a hard disk drive (HDD) controller 108, and the HD 109 as a storage unit, and an accelerated graphics port (AGP) bus 121 that connects the NB 103 and the ASIC 106.

The CPU 101 is a processor that performs overall control of the MFP 100. The NB 103 is a bridge for connecting the CPU 101 to the MEM-P 102, the SB 104, and the AGP bus 121, and includes a memory controller that controls reading and writing to the MEM-P 102, a peripheral component interconnect (PCI) master, and an AGP target.

The MEM-P 102 includes a read only memory (ROM) 102*a* that stores program and data for implementing various functions of the controller 110. The MEM-P 102 further includes a random access memory (RAM) 102*b* that deploys the program and data, or a drawing memory that stores drawing data for printing. The program stored in the ROM 102*a* may be stored in any computer-readable storage medium, such as a compact disc-read only memory (CD-ROM), compact disc-recordable (CD-R), or digital versatile disc (DVD), in a file format installable or executable by the computer for distribution.

The SB 104 connects the NB 103 with a peripheral component interconnect (PCI) device or a peripheral device. The ASIC 106 is an integrated circuit (IC) dedicated to an image processing use, and connects the AGP bus 121, a PCI bus 122, the HDD controller 108, and the MEM-C 107.

The ASIC 106 includes a PCI target, an AGP master, an arbiter (ARB) as a central processor of the ASIC 106, a memory controller for controlling the MEM-C 107, a plurality of direct memory access controllers (DMACs) capable of converting coordinates of image data with a hardware logic, and a PCI unit that transfers data between a scanner 131 and a printer 132 through the PCI bus 122. The ASIC 106 may be connected to a universal serial bus (USB) interface, or an Institute of Electrical and Electronics Engineers 1394 (IEEE1394) interface.

The MEM-C 107 is a local memory used as a copy image buffer and a code buffer. The HD 109 is a storage for storing image data, font data for printing, and forms. The HD 109 stores an address of the external apparatus and the like.

The HDD controller 108 controls reading and writing of various data from and to the HD 109 under control of the CPU 101. The AGP bus 121 is a bus interface for a graphics accelerator card, which accelerates graphics processing. Through directly accessing the MEM-P 102 by high-throughput, speed of the graphics accelerator card is improved.

The short-range communication circuit 120 includes a short-range communication antenna 120*a*. The short-range communication circuit 120 is a communication circuit that communicates in compliance with the near field communication (NFC), the Bluetooth (registered trademark) and the like. The engine controller 130 includes a scanner 131 and a printer 132. The control panel 140 includes a panel display 140*a* and operation panel 140*b*. The panel display 140*a* is implemented by, for example, a touch panel that displays current settings or a selection screen and receives a user input. The operation panel 140*b* includes a numeric keypad that receives set values of various image forming parameters such as image density parameter and a start key that accepts an instruction for starting copying.

The controller 110 controls all operations of the MFP 100. For example, the controller 110 controls drawing, communication, or user inputs to the control panel 140. The scanner 131 and the printer 132 each performs various image processing, such as error diffusion processing or gamma conversion processing.

In response to an instruction to select a specific application through the control panel 140, for example, using a mode switch key, the MFP 100 selectively performs a document box function, a copy function, a print function, and a facsimile function. With selection of the print function, the MFP 100 operates in a print mode. With selection of the facsimile function, the MFP 100 operates in a facsimile mode. When the document box function is selected, the MFP 100 operates in a document box mode to store document data. With selection of the copy function, the MFP 100 operates in a copy mode.

The network I/F 150 is an interface that controls communication of data through a communication network. The short-range communication circuit 120 and the network I/F 150 are electrically connected to the ASIC 106 through the PCI bus 122.

As illustrated in FIG. 2, the controller 110 includes a non-volatile random access memory (NVRAM) 105. The NVRAM 105 is a non-volatile memory that retains information even during a period when power is not supplied to the MFP 100. The NVRAM 105 stores various types of information including settings information that enables communication with the external apparatus 200. Note that the settings information may be stored in another storage unit.

Figure 3:
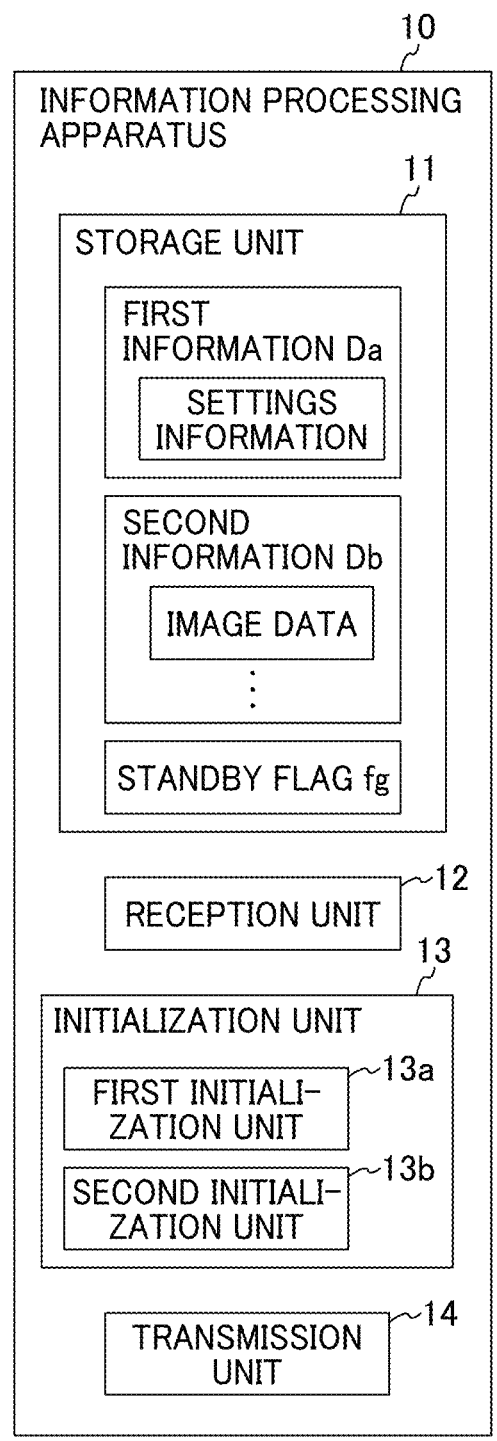
FIG. 3 is a functional block diagram of the information processing apparatus.

FIG. 3 is a functional block diagram of the information processing apparatus 10 according to the embodiment. As illustrated in FIG. 3, the information processing apparatus 10 includes a storage unit 11, a reception unit 12, an initialization unit 13, and a transmission unit (notification unit) 14. Each of these functional units of the MFP 100 is implemented by the CPU 101 executing the program. For example, a combination of the RAM 102b, the MEM-C 107, the NVRAM 105, and the HD 109 (refer to FIG. 2) functions as the storage unit 11.

As illustrated in FIG. 3, the storage unit 11 stores first information Da and second information Db. The first information Da and the second information Db are information initialized by the initialization process described below. Therefore, for example, information stored in the above-described ROM 102a (non-rewritable memory) is not included in any of the first information Da and the second information Db.

The information (the first information Da and the second information Db) initialized by the initialization process may be changed as appropriate. Specifically, all the information stored in the RAM 102b, the MEM-C 107, the NVRAM 105, and the HD 109 may be initialized, or some of the information may be initialized. For example, a part of the program stored in the RAM 102b may not be initialized. Further, in a case where maintenance information (such as information indicating a use period (number of times) of a component) used for maintenance of the MFP 100 (component replacement or the like) is stored, it is preferable that the maintenance information is not initialized.

The first information Da is information that enables communication with the external apparatus 200. The first information Da includes the above-described settings information. The second information Db is information different from the first information Da. For example, the second information Db is image data or the like stored in the HD 109 described above.

The reception unit 12 of the information processing apparatus 10 receives the initialization instruction described above. In response to the initialization instruction, the initialization unit 13 initializes each information (Da, Db) in the storage unit 11. In response to an end information transmission instruction from the external apparatus 200, the transmission unit 14 transmits the end information to the external apparatus 200.

The initialization unit 13 includes a first initialization unit 13a and a second initialization unit 13b as illustrated in FIG. 3. In response to the initialization instruction, the first initialization unit 13a initializes the second information Db among the first information Da and the second information Db. When the initialization by the first initialization unit 13a is completed and the transmission unit 14 receives the end information transmission instruction from the external apparatus 200, the transmission unit 14 transmits the end information to the external apparatus 200. When the end information is transmitted, the second initialization unit 13b initializes the first information Da.

As illustrated in FIG. 3, the storage unit 11 stores a standby flag fg in addition to the first information Da and the second information Db. As described above, according to the present embodiment, the second information Db among the first information Da and the second information Db is initialized first by the first initialization unit 13a and after the end information is transmitted by the transmission unit 14, the first information Da is initialized by the second initialization unit 13b. The standby flag fg is set during a period in which the initialization of the second information Db is completed, and the end information is not transmitted (a period before the first information Da is initialized).

Hereinafter, a period in which the standby flag fg is set is referred to as a "standby period". In the standby period, the second information Db is initialized, but the first information Da (information enabling communication with the external apparatus) is not initialized. Therefore, the standby period is a period in which communication between the information processing apparatus 10 and the external apparatus 200 can be established.

After transmitting the initialization instruction, the external apparatus 200 transmits the end information transmission instruction to the information processing apparatus 10. The information processing apparatus 10 receives the end information transmission instruction and transmits the end information to the external apparatus 200 during the standby period. The end information described above is information for notifying that the initialization of the second information Db has been completed. When transmitting the end information, the information processing apparatus 10 ends the standby period by resetting the standby flag fg, and initializes the first information Da.

As described above, the standby period is a period that the MFP100 waits to receive the end information transmission instruction from the external apparatus 200. The standby period is also a period in which the second information Db is initialized and the MFP 100 waits in a state where the end information can be transmitted without initializing the first information Da. However, after the second information Db is initialized, the end information may be transmitted irrespective of an instruction from the external apparatus 200 to initialize the first information Da.

Figure 4:
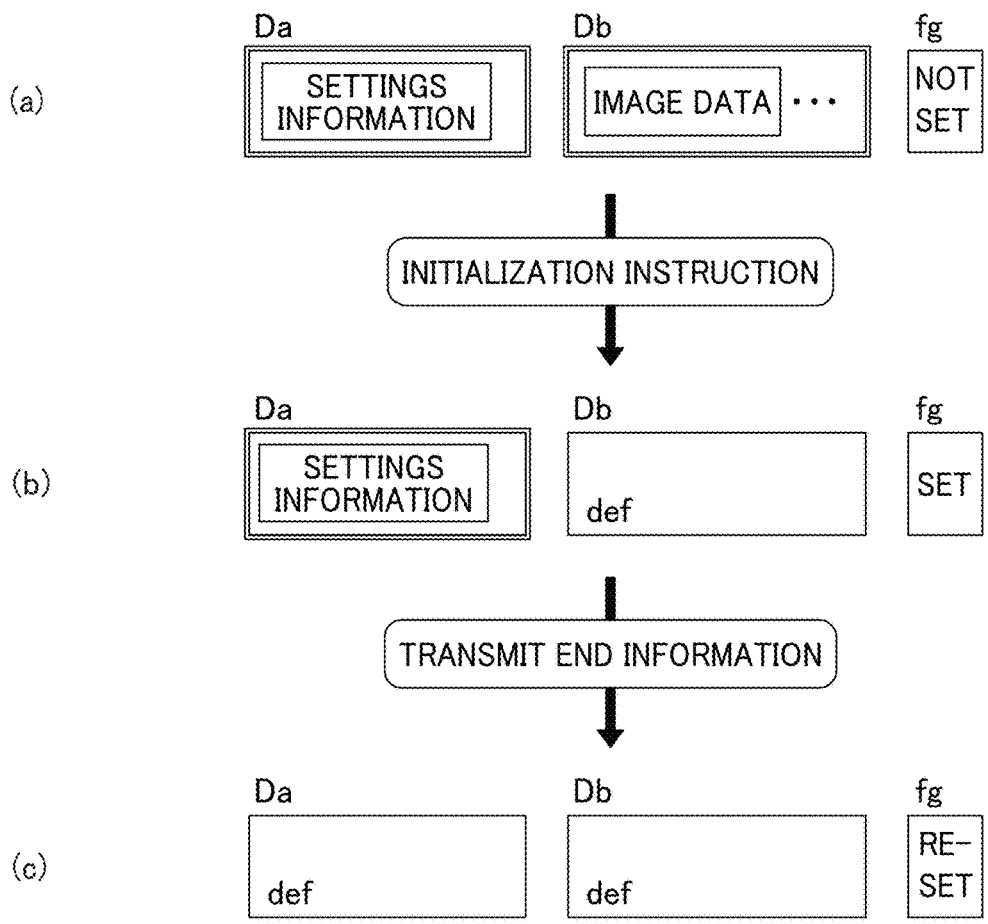
FIG. 4 is a diagram illustrating a specific example of an initialization process.

FIG. 4 is a diagram illustrating an example of initialization process of the information (Da, Db) stored in the storage unit 11.

In the present embodiment, in addition to the case where the initialization instruction is received from the external apparatus 200, the information in the storage unit 11 may be initialized by directly operating the information processing apparatus 10. Hereinafter, the initialization process executed by the direct operation of the information processing apparatus 10 may be referred to as a "direct initialization process", and the initialization process executed in response to the initialization instruction may be referred to as a "remote initialization process".

FIG. 4 illustrates an example of the remote initialization process. The remote initialization process includes a first initialization process executed by the first initialization unit 13a and a second initialization process executed by the second initialization unit 13b.

FIG. 4(a) is a diagram illustrating information before the initialization process is executed. As illustrated in FIG. 4(a), the storage unit 11 stores the settings information as the first information Da and stores various information including image data as the second information Db before the initialization process is executed. Further, the standby flag fg is not set before the initialization process is executed.

FIG. 4(b) illustrates an example when the initialization instruction is received in the example of FIG. 4(a) described above. When the initialization instruction is received, the first initialization unit 13a of the information processing apparatus 10 executes the first initialization process. When the first initialization process is executed, the second information Db is initialized as illustrated in FIG. 4(b). The second information Db is reset to a default (def) value.

When the first initialization process is executed, the standby flag fg is set, and the process shifts to the standby period. As described above, the information processing apparatus 10 waits for the end information transmission instruction from the external apparatus 200 while the first information Da is not initialized in the standby period. When the end information transmission instruction is received during the standby period, the information processing apparatus 10 transmits the end information. FIG. 4(c) illustrates an example when the end information is transmitted in the example of FIG. 4(b) described above. When the end information is transmitted, the second initialization unit 13b of the information processing apparatus 10 executes the second initialization process. When the second initialization process is executed, the first information Da is initialized as illustrated in FIG. 4(c). The first information Da is reset to a default (def) value. When the second initialization process is executed, the standby flag fg is reset, and the standby period ends.

As described above, in the present embodiment, the information processing apparatus 10 includes the first initialization unit 13a that initializes the second information Db among the first information Da and the second information Db in response to the initialization instruction, a transmission unit 14 that transmits to the external apparatus 200, end information for notifying the completion of the initialization in response to completion of the initialization by the first initialization unit 13a, and second initialization unit 13b for initializing the first information Da in response to the transmission of the end information.

In the above configuration, after transmitting the end information notifying that the initialization of the second information Db has been completed to the external apparatus 200, the first information Da enabling communication with the external apparatus 200 is initialized. The first information Da is not initialized until the end information is transmitted. Therefore, in the configuration for initializing each piece of information (Da, Db) including the first information Da enabling communication with the external apparatus 200, it is possible to transmit end information for notifying that the initialization has been completed to the external apparatus 200.

Figure 5A:
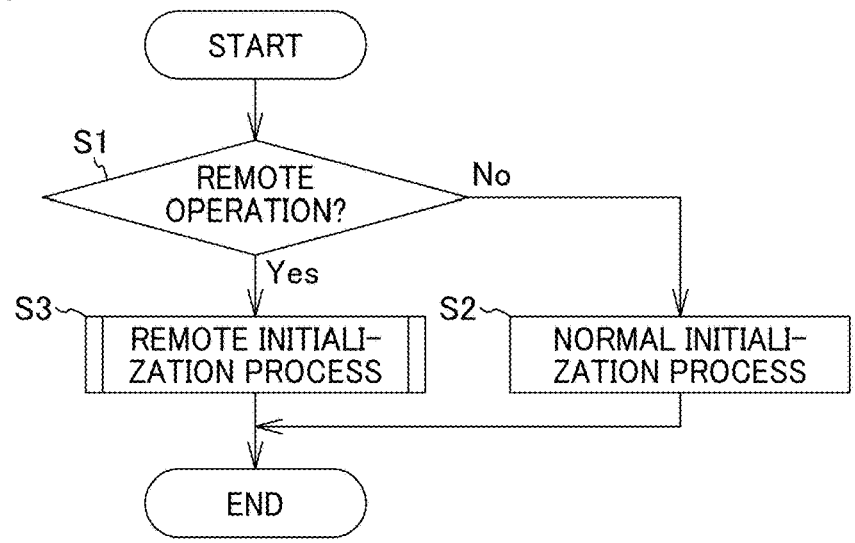
FIGS. 5A and 5B are flowcharts illustrating the initialization process according to a first embodiment.

FIG. 5A is a flowchart illustrating the initialization process executed by the information processing apparatus 10 according to the embodiment. The initialization process is executed when the information processing apparatus 10 is initialized by a direct operation of the information processing apparatus 10 or when the information processing apparatus 10 is initialized by a remote operation in response to the initialization instruction from the external apparatus 200.

As illustrated in FIG. 5A, when the initialization process is started, the information processing apparatus 10 determines whether the initialization instruction is received from the external apparatus 200 (S1). That is, in step S1, the information processing apparatus 10 determines whether the initialization is executed by the remote operation (operation on the external apparatus 200) or by the direct operation of the information processing apparatus 10.

When the information processing apparatus 10 determines that the initialization instruction is not received (No in step S), the information processing apparatus 10 executes a normal initialization process in step S2. That is, when the information processing apparatus 10 is directly operated, the normal initialization process is executed.

In the normal initialization process, the first information Da and the second information Db stored in the storage unit 11 are initialized. However, in the normal initialization processing, the standby period described above is not provided, and the end information is not transmitted. After executing the normal initialization process, the information processing apparatus 10 ends the initialization process.

Note that, when the normal initialization process is executed, information for notifying the user may be displayed on a display device. For example, a report such as a date and time of the initialization for notifying the result of the normal initialization process may be displayed on the panel display 140a. As another example, the above report may be printed.

If it is determined in step S that the initialization instruction is received (Yes in step S1), the information processing apparatus 10 executes the remote initialization process in step S3. When the remote initialization process is executed, the first information Da and the second information Db in the storage unit 11 are initialized, and the end information is transmitted to the external apparatus 200 (refer to FIG. 5B described below for details). After executing the remote initialization process, the information processing apparatus 10 ends the initialization process.

Figure 5B:
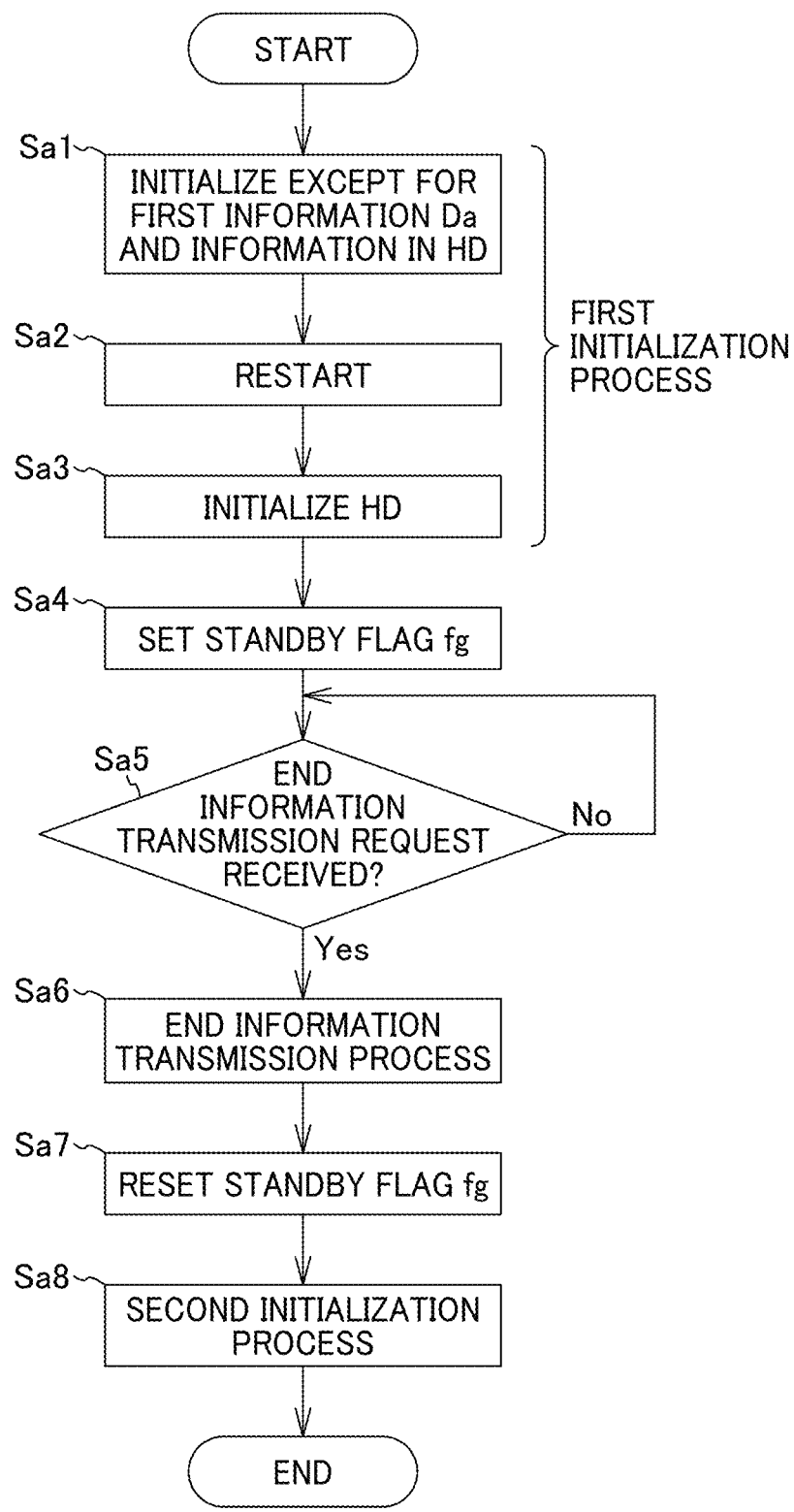

FIG. 5B is a flowchart illustrating the remote initialization process executed by the information processing apparatus 10 according to the embodiment. When the remote initialization process is started, the information processing apparatus 10 executes the first initialization process in steps Sa1 to Sa3. As described above, in the first initialization process, the second information Db among the information stored in the storage unit 11 is initialized.

Specifically, the first initialization process includes steps Sa1 to Sa3. In step Sa1, a part of the second information Db among the information stored in the storage unit 11 is initialized and the remaining part is initialized in step Sa3. In step Sa1, the first information Da is not initialized.

For example, in step Sa1, the second information Db excluding a part of the second information Db stored in the HD 109 is initialized. In the step Sa1 described above, information (except for the first information Da) stored in the NVRAM 105, the MEM-C 107, and the RAM 102b is initialized.

In step Sa2, the information processing apparatus 10 is restarted. After the restart, the information processing apparatus 10 initializes the information (the remaining part of the second information Db) stored in the HD 109 in step Sa3. In the first initialization process (steps Sa1 to Sa3), the second information Db stored in the storage unit 11 is initialized. If the restart is not required when initializing the HD 109, step Sa2 may be omitted.

After executing the first initialization process, the information processing apparatus 10 sets the standby flag fg in step Sa4. Accordingly, the standby period is started. When the standby period is started, the information processing apparatus 10 determines whether or not the end information transmission instruction is received from the external apparatus 200 in step Sa5. The information processing apparatus 10 repeatedly executes step Sa until the end information transmission instruction is received (No in step Sa5).

When it is determined that the end information transmission instruction is received (Yes in step Sa5), the information processing apparatus 10 executes an end information transmission process in step Sa6. In the end information transmission process, the end information is transmitted to the external apparatus 200. The end information transmission process described above is performed because the first information Da is not initialized during the standby period. After executing the end information transmission process, the information processing apparatus 10 resets the standby flag fg in step Sa7.

After resetting the standby flag fg, the information processing apparatus 10 executes the second initialization process in step Sa8. In the second initialization process, the first information Da (settings information) in the storage unit 11 is initialized.

In the above remote initialization process, both the first information Da and the second information Db are initialized while transmitting the end information to the external apparatus 200. The time at which the standby flag fg is reset may be changed as appropriate. For example, the standby flag fg may be reset after the second initialization process is executed.

Note that the apparatus that executes each of the above processes may be appropriately changed. Each of the above-described functions (a determination unit and the like) may be implemented by one or more processing circuits. Processing circuit includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Other embodiments of the present disclosure are described below. Note that, in the embodiments described below, elements having the same function as the elements described in the first embodiment is denoted by the reference numeral used in the description of the first embodiment, and detailed description thereof is appropriately omitted.

Figure 6:
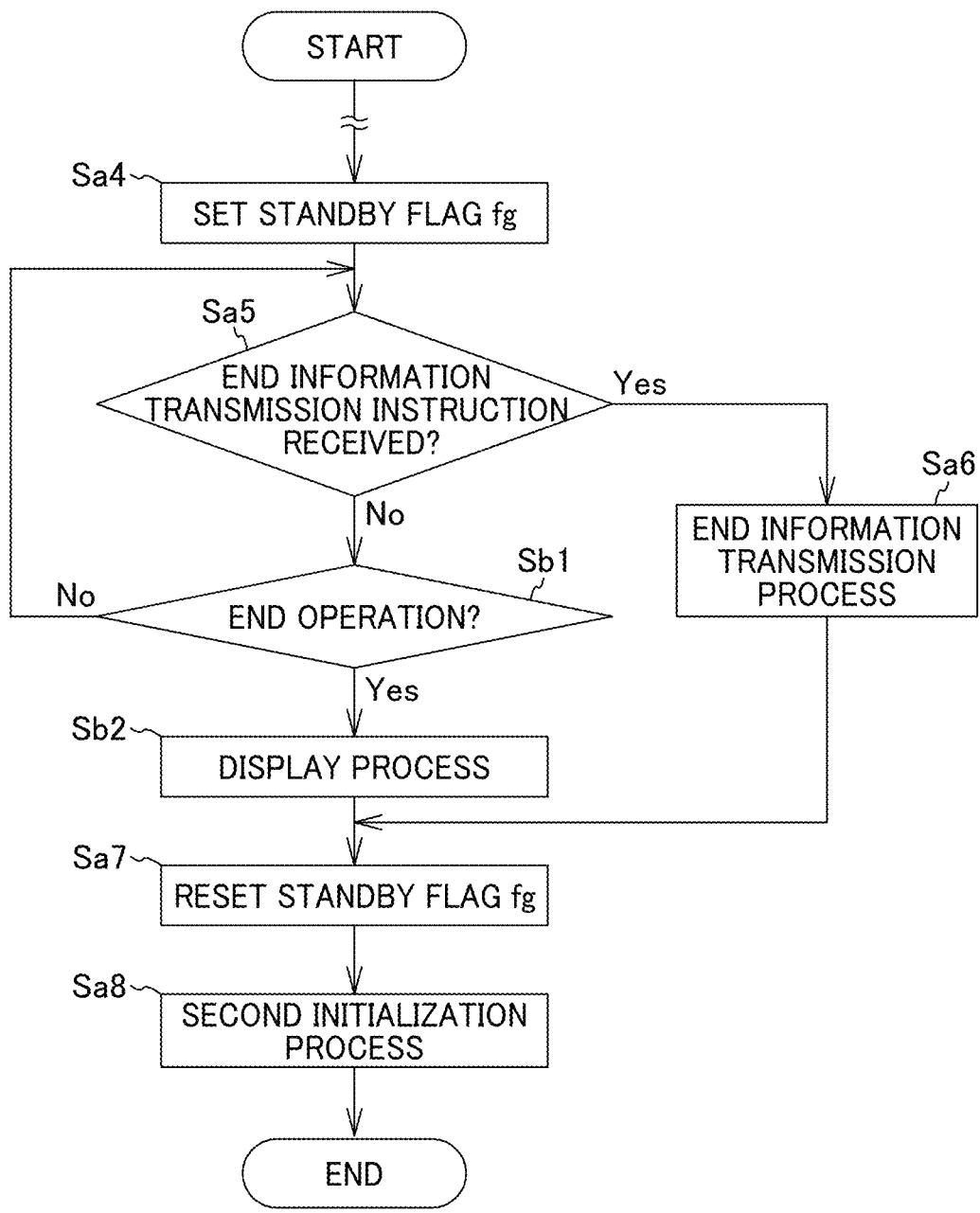
FIG. 6 is a flowchart illustrating the initialization process according to a second embodiment.

FIG. 6 is a flowchart illustrating the remote initialization process according to a second embodiment. The remote initialization process illustrated in FIG. 6 is executed when the information processing apparatus 10 receives an initialization instruction, as in the first embodiment. In the remote initialization process of the second embodiment, the standby period for waiting for the end information transmission instruction from the external apparatus 200 is provided, and the standby period ends when the end information transmission instruction is received in a substantially similar manner as described in the first embodiment.

The information processing apparatus 10 may not receive the end information transmission instruction after the information processing apparatus 10 shifts to the standby period, due to, for example, some trouble. For example, if a failure occurs on the communication path from the external apparatus 200 to the information processing apparatus 10 after the information processing apparatus 10 enters the standby period, the end information transmission instruction may not be received by the information processing apparatus 10.

In the above case, the information processing apparatus 10 cannot exit from the standby period. In consideration of the above circumstances, the information processing apparatus 10 according to the second embodiment is configured to prevent such inconvenience. Specifically, the information processing apparatus 10 includes an operation unit (for example, the control panel 140), and the standby period is forcibly ended by operating the operation unit in the standby period. The above configuration is described below in detail.

When starting the remote initialization process, the information processing apparatus 10 executes the first initialization process as in steps Sa1 to Sa3 illustrated in FIG. 5B of the first embodiment. However, each step of the first initialization process described above is omitted in FIG. 6. Note that among the steps illustrated in FIG. 6, the steps Sa4 to Sa8 having the same numbers as the steps in FIG. 5B have the same processing contents as in FIG. 5B.

After completing the first initialization process, the information processing apparatus 10 sets the standby flag fg and starts the standby period in step Sa4. As described below in detail with reference to FIG. 7, in the standby period of the second embodiment, the standby screen G is displayed on the display device, for example, the panel display 140a. The standby screen G described above is a screen for notifying that the information processing apparatus 10 is in the standby period.

After setting the standby flag fg, the information processing apparatus 10 determines whether the end information transmission instruction is received in step Sa5. When it is determined that the end information transmission instruction is received (Yes in step Sa5), the information processing apparatus 10 executes steps Sa6 to Sa8 and ends the remote initialization process as illustrated in FIG. 6 (the same as in the first embodiment).

On the other hand, when it is determined that the end information transmission instruction is not received (No in step Sa5), the information processing apparatus 10 determines whether or not an end operation is performed on the operation unit described above in step Sb1. If it is determined that the end operation is not performed (No in step Sb1), the information processing apparatus 10 returns the process to step Sa5 described above, as illustrated in FIG. 6. In the above configuration, step Sa5 and step Sb1 are repeatedly executed (the standby period continues) until the end information transmission instruction is received (Yes in step Sa5) or the end operation is performed (Yes in step Sb1).

Figure 7:
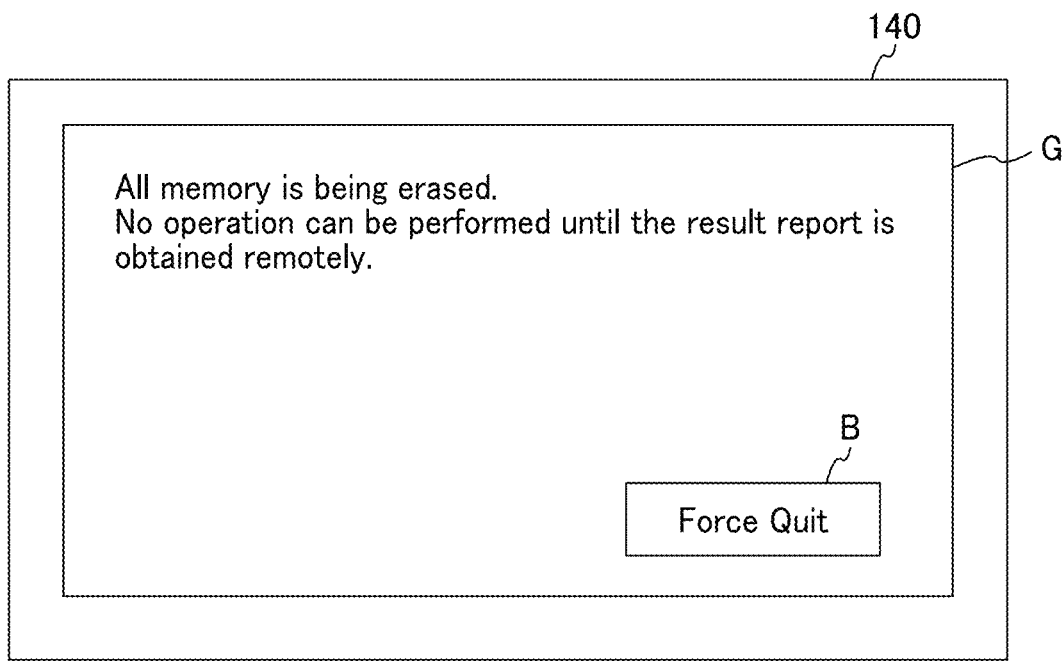
FIG. 7 is a schematic diagram of a standby screen displayed during a standby period according to the second embodiment.

If it is determined that the end operation is performed (Yes in step Sb1), the information processing apparatus 10 executes a display process in step Sb2. In the display process, information, such as the date and time when the initialization was performed, notified by the end information is displayed on the display device such as the panel display 140a. Specifically, the standby screen G illustrated in FIG. 7 is displayed on the panel display 140a during the standby period. When the end operation is performed, an image displaying the end information is displayed on the panel display 140a instead of the standby screen G.

Alternatively, information notified by the end information may be printed in the display process described above. After executing the display process, the information processing apparatus 10 resets the standby flag fg in step Sa7, executes the second initialization process in step Sa8, and ends the remote initialization process.

FIG. 7 is a schematic diagram of an example standby screen G during the standby period. As described above, the standby screen G is displayed, for example, on the control panel 140 (panel display 140a) during the standby period.

As illustrated in FIG. 7, a message indicating that the standby period is in progress is displayed on the standby screen G. In the example illustrated in FIG. 7, a message indicating that the information in the storage unit 11 is being initialized is displayed on the standby screen G. Until the end information transmission instruction is received from the external apparatus 200, a message indicating that a normal operation (for example, an operation for printing an image) is not accepted is displayed on the standby screen G.

As illustrated in FIG. 7, a force quit button B is displayed on the standby screen G. In the second embodiment, when the force quit button B is pressed, the information processing apparatus 10 determines that the end operation has been performed. As described above, when the end operation is performed, the standby flag fg is reset, and the second initialization process is executed even if the end information transmission instruction is not received.

In the second embodiment, the same effect as in the first embodiment described above is obtained. Further, in the second embodiment, the standby period is forcibly ended by accepting the end operation. The above configuration prevents the inconvenience that the standby period is not ended when the end information transmission instruction is not received normally.

In the second embodiment, the panel display 140a is described as an example of a display unit that indicates that the standby period is in progress. However, the display unit is not limited to the above example. For example, a speaker may be included as the display unit, and an indication of the standby period may be provided by voice.

Figure 8:
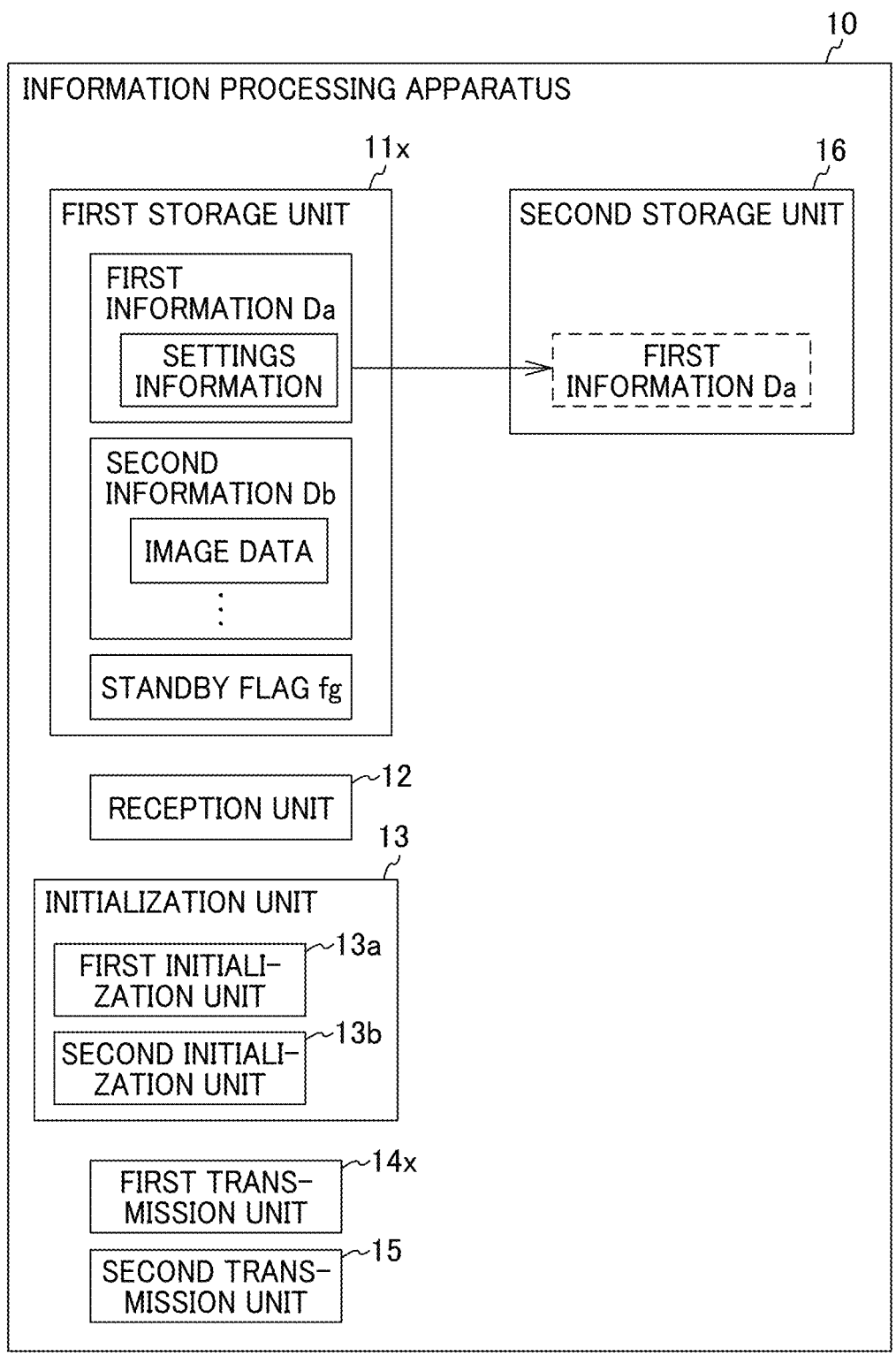
FIG. 8 is a functional block diagram of the information processing apparatus according to a third embodiment.

FIG. 8 is a functional block diagram of the information processing apparatus 10 according to a third embodiment. As illustrated in FIG. 8, the information processing apparatus 10 according to the third embodiment includes a first storage unit 11x, a reception unit 12, an initialization unit 13, a first transmission unit 14x, a second transmission unit 15 (notification unit), and a second storage unit 16. Each of these functional units of the MFP 100 is implemented by the CPU 101 executing the program. For example, the HD 109 illustrated in FIG. 2 functions as the first storage unit 11x.

As illustrated in FIG. 8, the first storage unit 11x stores the first information Da and the second information Db. Specifically, the first storage unit 11x is a nonvolatile memory. Therefore, the first storage unit 11x holds the first information Da and the second information Db even when power is not supplied to the information processing apparatus 10 (MFP 100). Alternatively, the first storage unit 11x may be implemented by a volatile memory.

The first information Da and second information Db are deleted (initialized) from the first storage unit 11x by an initialization process described below. As a method for initializing the first information Da and the second information Db, for example, a Department of Defense (DoD) erasing method may be adopted. In the DoD erasing method, data area of the first storage unit 11x is initialized by overwriting first with a numerical value "0", then overwriting with a fixed value, and further overwriting with a random number from a numerical value "0" to a numerical value "255". Note that the information (first information Da and second information Db) initialized by the initialization process can be appropriately changed, as in the first embodiment described above.

The reception unit 12 of the information processing apparatus 10 according to the third embodiment receives the initialization instruction described above from the external apparatus 200, similar to the first embodiment. When the initialization instruction is received, the initialization unit 13 initializes each piece of information (Da, Db) in the first storage unit 11x. In response to receiving the end information transmission instruction from the external apparatus 200, the first transmission unit 14x and the second transmission unit 15 transmit the end information (first end information and second end information) to the external apparatus 200.

Specifically, the end information of the third embodiment includes the first end information and the second end information. The first end information notifies that the initialization of the second information Db among the first information Da and the second information Db stored in the first storage unit 11x is completed. Further, the second end information notifies that the initialization of the first information Da among the first information Da and the second information Db stored in the first storage unit 11x is completed.

As illustrated in FIG. 8, the initialization unit 13 according to the third embodiment includes a first initialization unit 13a and a second initialization unit 13b, similar to the first embodiment. In response to the initialization instruction, the first initialization unit 13a initializes the second information Db among the first information Da and the second information Db. When the initialization by the first initialization unit 13a is completed and the end information transmission instruction is received from the external apparatus 200, the first transmission unit 14x transmits the first end information to the external apparatus 200. When the first end information is transmitted, the second initialization unit 13b initializes the first information Da.

In the present embodiment, the first information Da is initialized after the second information Db is initialized. Further, when the initialization by the second initialization unit 13b is completed, the second transmission unit 15 transmits second end information to the external apparatus 200. In the present embodiment described above, the first end information is transmitted when the second information Db is initialized, and the second end information is transmitted when the first information Da is initialized. That is, the first end information is transmitted before the first information Da is initialized.

It is assumed that the first end information is transmitted after the first information Da and the second information Db stored in the first storage unit 11x are both initialized. In the above comparative example, when communication with the external apparatus 200 is disabled (when a communication failure occurs) while initializing the first information Da, even if the second information Db is initialized, the first end information (indicating that the initialization of the second information Db is completed) is not transmitted.

Considering the above circumstances, in the present embodiment, when the initialization of the second information Db among the pieces of information store in the first storage unit 11x is completed, the first end information is transmitted before the first information Da is initialized. The above configuration solves the inconvenience described above. Details of the above configuration is described below.

As illustrated in FIG. 8, the first storage unit 11x stores the standby flag fg in addition to the first information Da and the second information Db.

The second storage unit 16 (specific storage unit) acquires and stores (evacuates) the first information Da before the first information Da stored in the first storage unit 11x is initialized. In the above configuration, the first information Dais stored (saved) in the second storage unit 16 after the first information Da of the first storage unit 11x is initialized. The first information Da is information that enables communication with the external apparatus 200 as described above.

In the present embodiment, communication with the external apparatus 200 is enabled by referring to the first information Da stored in the second storage unit 16 after the first information Da stored in the first storage unit ix is initialized. That is, the second end information is transmitted to the external apparatus 200 after the first information Da stored in the first storage unit 11x is initialized. Therefore, there is an advantage that the external apparatus 200 is notified of the initialization of the first information Da stored in the first storage unit 11x.

The second storage unit 16 of the present embodiment is a volatile memory. However, the second storage unit 16 may be implemented by a nonvolatile memory. Further, the first storage unit 11x and the second storage unit 16 may be provided as separate hardware or may be provided as common hardware.

Figure 9B:
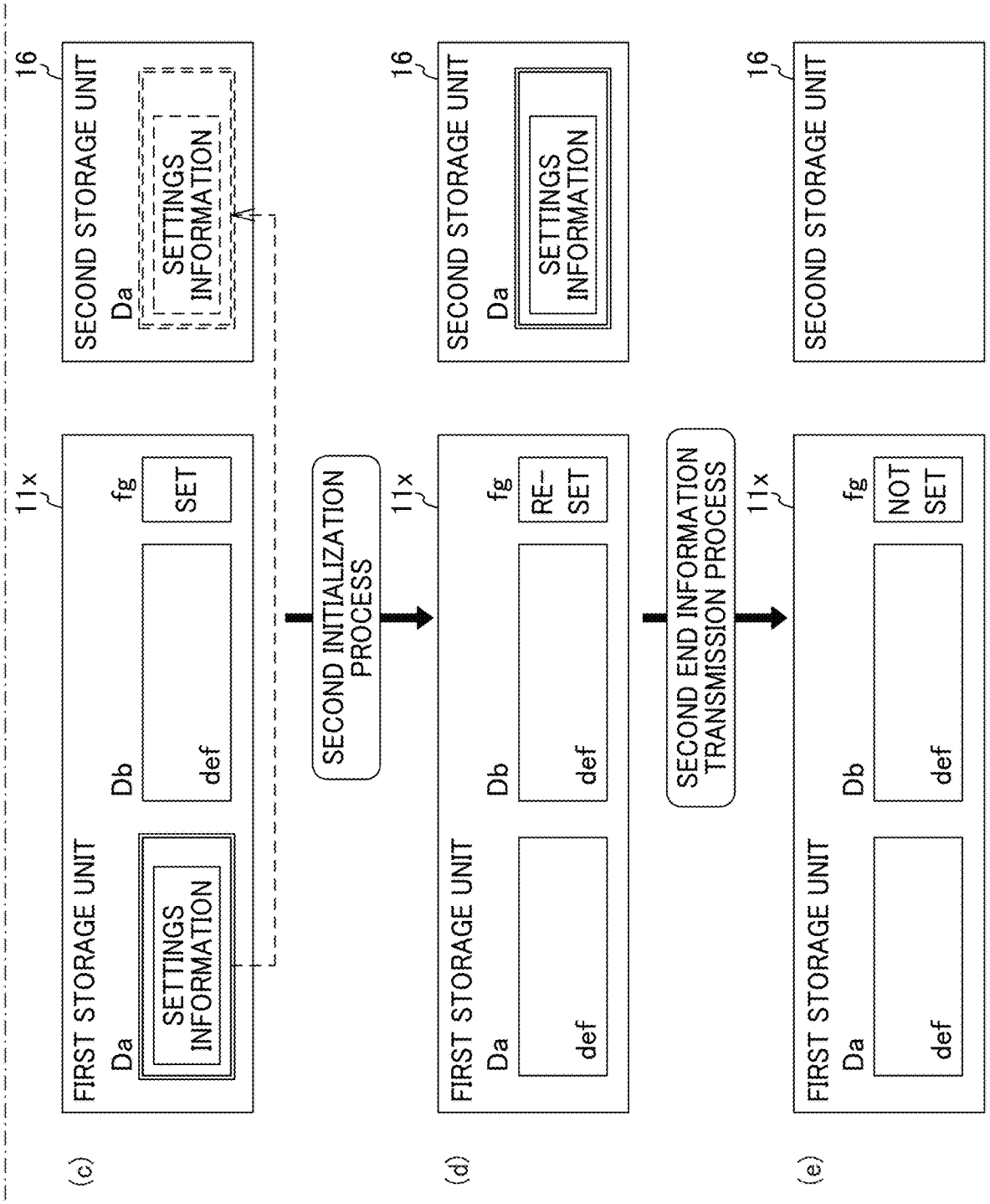

FIG. 9A and FIG. 9B are diagrams illustrating an example when the information (Da, Db) stored in the first storage unit 11x is initialized. In the third embodiment, the information stored in the first storage unit 11x is initialized by directly operating the information processing apparatus 10 in addition to receiving the initialization instruction from the external apparatus 200 as described in the first embodiment.

FIG. 9A and FIG. 9B illustrate an example of the remote initialization process. The remote initialization process includes a first initialization process executed by the first initialization unit 13a and a second initialization process executed by the second initialization unit 13b.

FIG. 9A(a) is a diagram illustrating information before the initialization process is executed. As illustrated in FIG. 9A(a), the storage unit 11x stores settings information as the first information Da and also stores various information including image data as the second information Db before the initialization process is executed. Further, the standby flag fg is not set before the initialization process is executed.

FIG. 9A(b) illustrates an example when an initialization instruction is received in the example of FIG. 9A(a) described above. In response to receiving the initialization instruction, the first initialization unit 13a of the information processing apparatus 10 executes the first initialization process. When the first initialization process is executed, the second information Db stored in the first storage unit 11x is initialized as illustrated in FIG. 9A(b). The second information Db is reset to a default (def) value.

When the first initialization process is executed, the standby flag fg is set, and the process shifts to the standby period. As described above, the information processing apparatus 10 waits for the end information transmission instruction from the external apparatus 200 while the first information Da is not initialized in the standby period. In response to the end information transmission instruction received during the standby period, the information processing apparatus 10 transmits the first end information.

FIG. 9B(c) illustrates an example when the first end information is transmitted in the example of FIG. 9A(b) described above. As illustrated in FIG. 9B(c), when the first end information is transmitted, the information processing apparatus 10 saves (stores) the first information Da from the first storage unit 11x to the second storage unit 16. Further, when the first end information is transmitted, the second initialization unit 13b of the information processing apparatus 10 executes a second initialization process.

FIG. 9B(d) illustrates an example when the second initialization process is executed in the example of FIG. 9B(c) described above. When the second initialization process is executed, the first information Da stored in the first storage unit ix is initialized as illustrated in FIG. 9B(d). The first information Dais reset to a default (def) value. When the second initialization process is executed, the standby flag fg is reset, and the standby period ends.

After executing the second initialization process, the information processing apparatus 10 according to the present embodiment transmits second end information to the external apparatus 200. As described above, the second end information notifies that the first information Da stored in the first storage unit 11x is initialized. The information processing apparatus 10 transmits the second end information to the external apparatus 200 using the first information Da stored in the second storage unit 16.

FIG. 9B(e) illustrates an example when the second end information is transmitted in the example illustrated in FIG. 9B(d) described above. After transmitting the second end information, the information processing apparatus 10 clears (erases) the first information Da stored in the second storage unit 16. The trigger for clearing the first information Da stored in the second storage unit 16 may be changed as appropriate. For example, the first information Da stored in the second storage unit 16 may be cleared when the information processing apparatus 10 is started (when the power is turned on).

As described above, in the present embodiment, the information processing apparatus includes the first initialization unit 13a that initializes the second information Db among the first information Da and the second information Db stored in the first storage unit 11x in response to the initialization instruction, the first transmission unit 14x that transmits the first end information for notifying completion of the initialization to the external apparatus 200 when the initialization by the first initialization unit 13a is completed, and a second initialization unit 13b for initializing the first information Da stored in the first storage unit 11x when the first end information is transmitted.

With the above configuration, when the initialization of the second information Db among the information stored in the first storage unit 11x is completed, the first end information is transmitted before the first information Da is initialized. Therefore, even if the communication with the external apparatus 200 is disabled (when a communication failure occurs) during the initialization of the first information Da after the initialization of the second information Db, the first end information (notifying that the initialization of the second information Db is completed) is transmitted to the external apparatus 200.

Further, in the present embodiment, the information processing apparatus 10 includes the second storage unit 16 that acquires and stores the first information Da before the first information Da stored in the first storage unit 11x is initialized and the second transmission unit 15 for transmitting to the external apparatus 200 the second end information for notifying the completion of the initialization when the initialization by the second initialization unit 13b is completed. The above configuration has an advantage that the external apparatus 200 is notified of the initialization of the first information Da stored in the first storage unit 11x.

Figure 10:
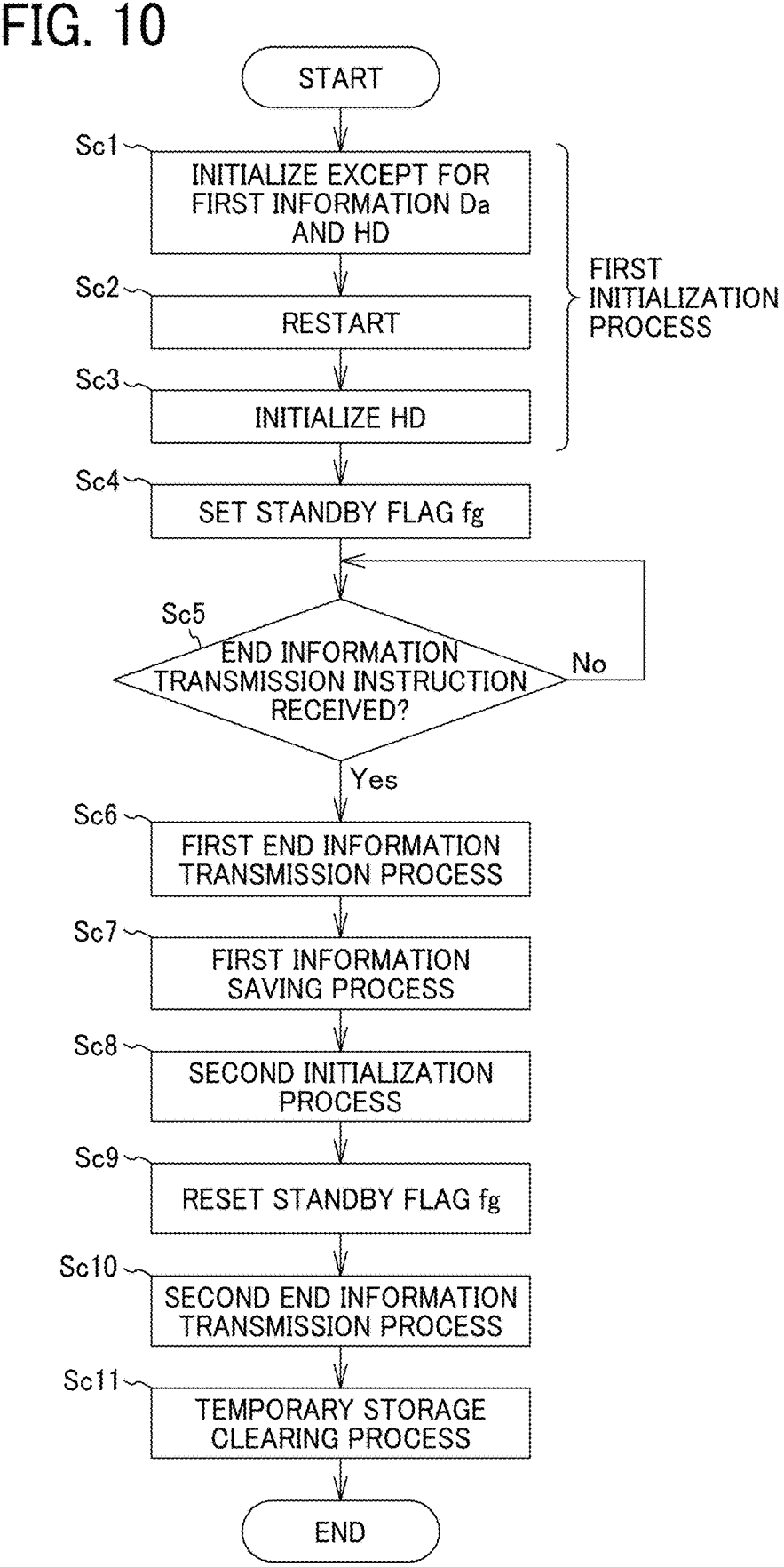
FIG. 10 is a flowchart illustrating the initialization process according to the third embodiment.

FIG. 10 is a flowchart illustrating the remote initialization process executed by the information processing apparatus 10 according to the third embodiment. When the remote initialization process is started, the information processing apparatus 10 executes the first initialization process in steps Sc1 to Sc3. As described above, in the first initialization process, the second information Db among the information stored in the first storage unit 11x is initialized.

Specifically, the first initialization process includes step Sc1 to step Sc3. In step Sc1, a part of the second information Db among the information stored in the first storage unit 11x is initialized and the remaining part is initialized in step Sc3. In step Sc1, the first information Da is not initialized.

For example, in step Sc1, the second information Db excluding a part of the second information Db stored in the HD 109 is initialized. In the above step Sc1, information (except for the first information Da) stored in the NVRAM 105, the MEM-C 107, and the RAM 102b is initialized.

In step Sc2 after executing step Sc1, the information processing apparatus 10 is restarted. After the restart, the information processing apparatus 10 initializes the information (the remaining part of the second information Db) stored in the HD 109 in step Sc3. According to the first initialization process in step Sc1 to step Sc3, the second information Db stored in the first storage unit 11x is initialized. Note that, if the restart is not required to initialize the HD 109, step Sc2 may be omitted.

After executing the first initialization process, the information processing apparatus 10 sets the standby flag fg in step Sc4. Accordingly, the standby period is started. When the standby period is started, the information processing apparatus 10 determines whether or not the end information transmission instruction is received from the external apparatus 200 in step Sc5. The information processing apparatus 10 repeatedly executes step Sc5 until the end information transmission instruction is received (No in step Sc5).

When the information processing apparatus 10 determines that the end information transmission instruction is received (Yes in step Sc5), the information processing apparatus 10 executes the first end information transmission process in step Sc6. In the first end information transmission process, the first end information is transmitted to the external apparatus 200 using the first information Da stored in the first storage unit 11x.

After executing the first end information transmission process, the information processing apparatus 10 executes a first information saving process in step Sc7. In the first information saving process, the first information Da stored in the first storage unit 11x is saved (stored) to the second storage unit 16. After executing the first information saving process, the information processing apparatus 10 executes the second initialization process in step Sc8. In the second initialization process, the first information Da (settings information) stored in the first storage unit 11x is initialized.

After executing the second initialization process, the information processing apparatus 10 resets the standby flag fg in step Sc9 and executes the second end information transmission process in step Sc10. In the second end information transmission process, the second end information is transmitted to the external apparatus 200 using the first information Da stored in the second storage unit 16. After executing the second end information transmission process, the information processing apparatus 10 executes a temporary storage clearing process in step Sc11 and ends the remote initialization process. In the temporary storage clearing process, the first information Da stored in the second storage unit 16 is deleted.

In the above remote initialization process, both the first information Da and the second information Db are initialized while transmitting the end information to the external apparatus 200. Further, in addition to the first end information notifying that the initialization of the second information Db is complete, the second end information notifying that the initialization of the first information Da is completed is transmitted to the external apparatus 200. The time at which the standby flag fg is reset may be changed as appropriate. For example, the standby flag fg may be reset after the second initialization process is executed.

The time at which the first information saving process is executed may be changed as appropriate. For example, the first information saving process may be executed before the initialization process is executed. The first information Da (settings information) stored in the first storage unit 11x may be saved (backed up) to the second storage unit 16, each time the first information Da (settings information) stored in the first storage unit 11x is changed.

Further, the time at which the temporary storage clearing process is executed may be changed appropriately as long as the second end information transmission process is completed. For example, the temporary storage clearing process may be included in a process different from the remote initialization process. For example, the temporary storage clearing process may be executed in the startup process immediately after the information processing apparatus 10 is powered on. Further, the temporary storage clearing process may be executed in both the remote initialization process and the startup process.

In the third embodiment described above, the first end information is transmitted to the external apparatus 200 after the first information Da among the first information Da and the second information Db stored in the first storage unit is initialized, and then the second end information is transmitted to the external apparatus 200 after the second information Db is initialized. (Initialize the first information Da, transmit the first end information, initialize the second information Db, and transmit the second end information).

In a fourth embodiment, the first information Da among the first information Da and the second information Db stored in the first storage unit is initialized, and after the second information Db is initialized, the end information is transmitted to the external apparatus 200. (Initialize the first information Da, initialize the second information Db, and transmit the end information). The end information of the fourth embodiment indicates the completion of the initialization of both the first information Da and the second information Db.

Specifically, similar to the information processing apparatus 10 according to the third embodiment, the information processing apparatus 10 according to the fourth embodiment includes the first storage unit 11x, the reception unit 12, the first initialization unit 13a, the second initialization unit 13b and the second storage unit 16. However, the information processing apparatus 10 according to the fourth embodiment includes a transmission unit configured to transmit the end information described above to the external apparatus 200 instead of the first transmission unit 14x and the second transmission unit 15 of the information processing apparatus 10 according to the third embodiment. The transmission unit according to the fourth embodiment transmits the end information to the external apparatus 200 when both the initialization by the first initialization unit 13a and the initialization by the second initialization unit 13b are completed.

Figure 11:
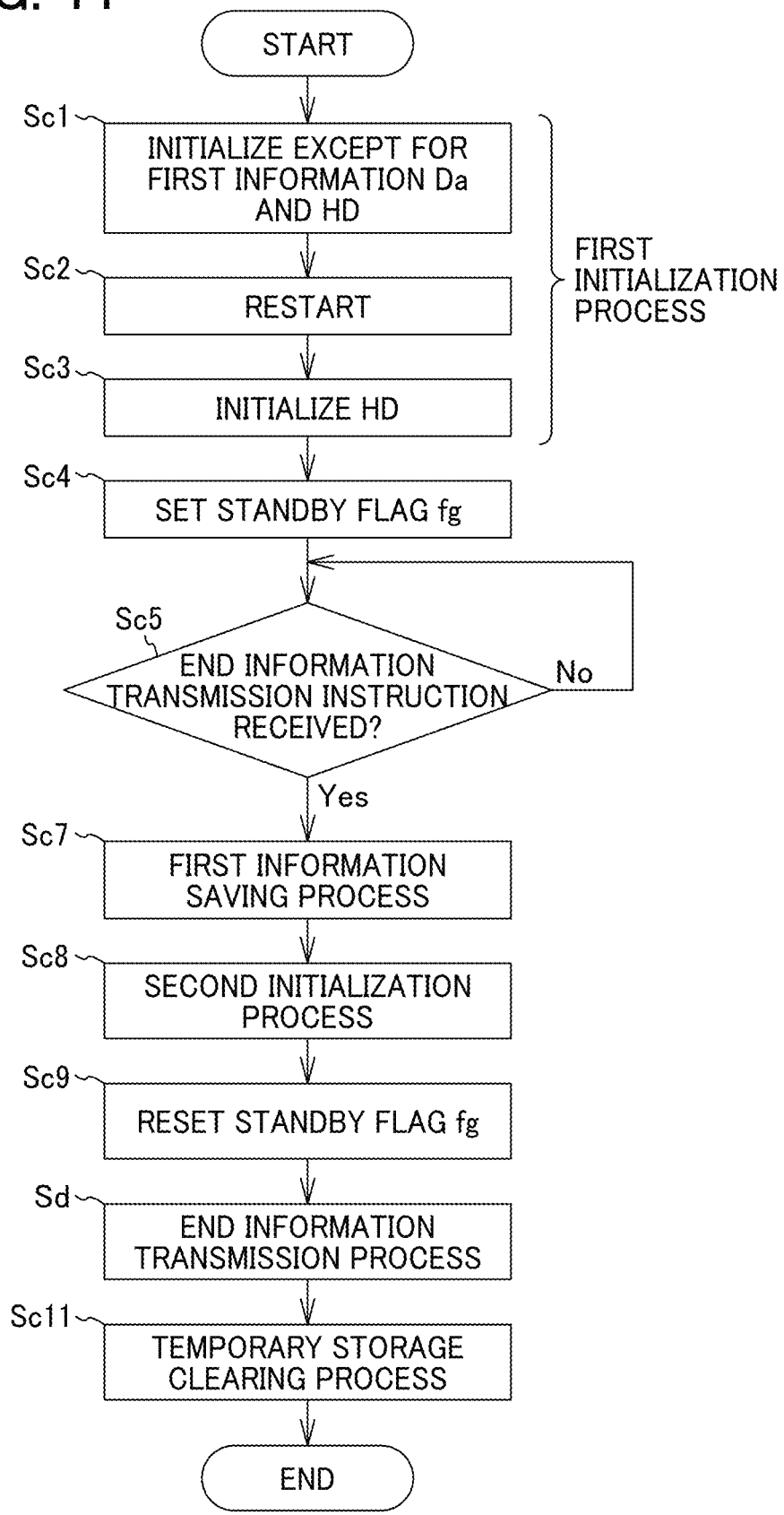
FIG. 11 is a flowchart illustrating the initialization process according to a fourth embodiment.

FIG. 11 is a flowchart illustrating the initialization process according to the fourth embodiment. Steps Sc1 to Sc5, Sc7 to Sc9, and Sc11 of the remote initialization process in the fourth embodiment illustrated in FIG. 11 are the same as the respective steps described in FIG. 10.

As illustrated in FIG. 11, when the remote initialization process is started, steps Sc1 to Sc5 are executed as in the third embodiment. However, in the third embodiment described above, step Sc6 (first end information transmission process) is executed after step Sc5, but step Sc6 is omitted in the fourth embodiment.

Specifically, in the fourth embodiment, when the end information transmission instruction is received (Yes in step Sc5), the first information saving process is executed in step Sc7 and then the second initialization process is executed in step Sc8. Accordingly, the first information Da is saved to the second storage unit 16, and the first information Da stored in the first storage unit 11x is initialized. Further, the standby flag fg is reset. Further, according to the third embodiment described above, step Sc10 (second end information transmission process) is executed after step Sc9, but according to the fourth embodiment, step Sc10 is omitted, and the end information transmission process (Sd) is executed.

In the remote initialization process according to the fourth embodiment, the end information transmission process (step Sc6 illustrated in FIG. 10) and the second end information transmission process (step Sc10 illustrated in FIG. 10) according to the third embodiment are replaced with the end information transmission process executed in step Sd. In the end information transmission process described above, the end information notifying that the initialization of both the first information Da and the second information Db are completed is transmitted to the external apparatus 200. After executing the end information transmission process, the information processing apparatus 10 executes the temporary storage clearing process in step Sc11 and ends the remote initialization process.

In the fourth embodiment, in addition to the completion of the initialization of the second information Db, the external apparatus 200 is notified that the initialization of the first information Da is completed, similar to the third embodiment.

Figure 12:
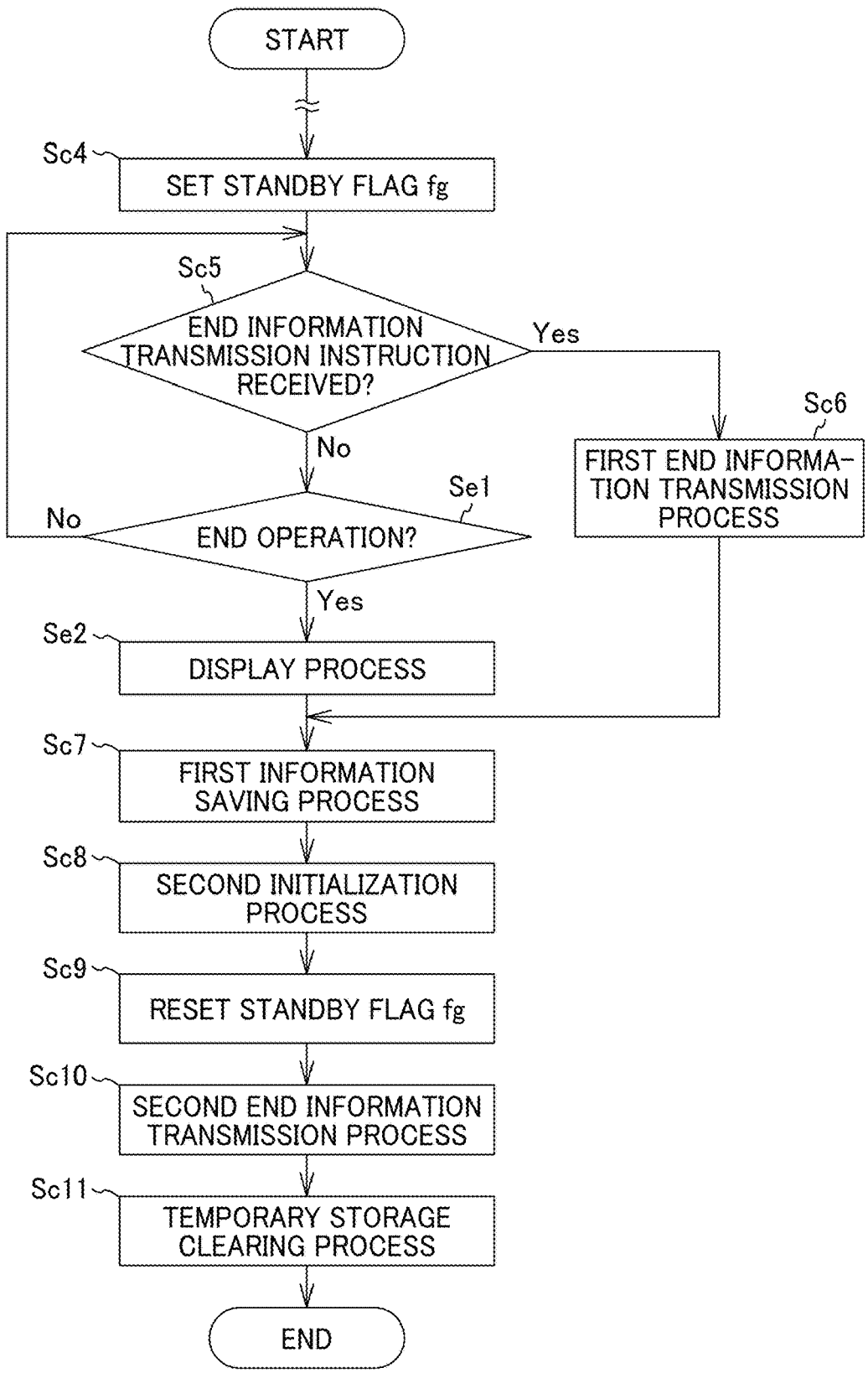
FIG. 12 is a flowchart illustrating the initialization process according to a fifth embodiment.

FIG. 12 is a flowchart illustrating the initialization process according to a fifth embodiment. The remote initialization process illustrated in FIG. 6 is executed when the information processing apparatus 10 receives an initialization instruction, as in the first embodiment. In the remote initialization process according to the fifth embodiment, the standby period for waiting for the end information transmission instruction from the external apparatus 200 is provided, and the standby period ends when the end information transmission instruction is received. The information processing apparatus 10 according to the fifth embodiment includes the operation unit (for example, the control panel 140), and the standby period may be forcibly ended by operating the operation unit during the standby period. The above configuration is described below in detail.

When starting the remote initialization process, the information processing apparatus 10 executes the first initialization process (steps Sc1 to Sc3 in FIG. 10) as in the third embodiment. However, in the flowchart illustrated in FIG. 12, each step of the first initialization process described above is omitted. Note that among the steps illustrated in FIG. 12, the steps Sc4 to Sc11 having the same numbers as steps illustrated in FIG. 10 have the same processing contents as the steps illustrated in FIG. 10.

After finishing the first initialization process, the information processing apparatus 10 sets the standby flag fg and starts the standby period in step Sc4. In the standby period according to the fifth embodiment, the standby screen G is displayed as in the second embodiment.

After setting the standby flag fg, the information processing apparatus 10 determines whether the end information transmission instruction is received in step Sc5. When the information processing apparatus 10 determines that the end information transmission instruction is received (Yes in step Sc5), the information processing apparatus 10 executes steps Sc6 to Sc11 and ends the remote initialization process as illustrated in FIG. 12.

On the other hand, when the information processing apparatus 10 determines that the end information transmission instruction is not received (No in step Sc5), the information processing apparatus 10 determines whether or not the end operation has been performed on the operation unit described above in step Se1. When the information processing apparatus 10 determines that the end operation is not performed (No in step Se1), the information processing apparatus 10 returns the process to step Sc5 described above, as illustrated in FIG. 12. Step Sc5 and step Se1 are repeatedly executed (standby period continues) until the end information transmission instruction is received (Yes in step Sc5) or the end operation is performed (Yes in step Se1).

When the information processing apparatus 10 determines that the end operation is performed (Yes in step Se1), the information processing apparatus 10 executes the display process in step Se2. In the display process, information, such as the date and time when the initialization was performed, notified by the end information is displayed on the display device such as the panel display 140a. Specifically, the standby screen G illustrated in FIG. 7 is displayed on the panel display 140a during the standby period. When the end operation is performed, an image displaying the end information is displayed on the panel display 140a instead of the standby screen G. Alternatively, information notified by the end information may be printed in the display process described above.

In the fifth embodiment, the end information for notifying the end of the initialization of both the first information Da and the second information Db may be transmitted after executing the first initialization process and the second initialization process, similar to the fourth embodiment described above. According to the fifth embodiment, the same effect as in the fourth embodiment described above is obtained.

Each of the above embodiments is variously modified. Specific modifications is described below. Two or more embodiments selected from the following examples may be appropriately combined.

The end information in each of the above embodiments may be changed as appropriate. FIG. 13A is a diagram illustrating the end information in a first modified embodiment. The end information illustrated in FIG. 13A may be adopted as, for example, the second end information according to the third embodiment or the end information according to the fourth embodiment.

As illustrated in FIG. 13A, the end information according to the first modified embodiment includes the serial number of the information processing apparatus 10 on which the remote initialization process has been executed, and the date and time when the end information was received by the external apparatus 200. The end information illustrated in FIG. 13A further includes the model name (model number) of the information processing apparatus 10 on which the remote initialization process was executed, the execution date and time of the remote initialization process, the serial number of the HD 109, the initialization method, and the number of repetition of initialization.

Further, the end information according to the first modified embodiment includes a result of the first initialization process ("Result" in FIG. 13A) and a result of the second initialization process ("Network Deletion" in FIG. 13A). In the example illustrated in FIG. 13A, it is assumed that the second information Db is successfully initialized in the first initialization process, and the first information Da is successfully initialized in the second initialization process.

FIG. 13B is a diagram illustrating the end information in a second modified embodiment. The end information illustrated in FIG. 13B may be adopted as the first end information in the first embodiment, for example.

The first end information in FIG. 13B includes various types of information including the result of the first initialization process and the result of the second initialization process, similar to the end information in FIG. 13A described above. However, the first end information is generated before the second initialization process is executed. Therefore, at the time when the first end information is generated, the result of the second initialization process is unknown. From the above circumstances, as illustrated in FIG. 13B, in the first end information of the modified example, as a result of the second initialization process, the fact that the second initialization processing has not been executed is notified.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An information processing apparatus comprising circuitry configured to:
   store in a first memory, first information that enables communication with an external apparatus, and second information, the second information being different from the first information;
   receive an initialization instruction from the external apparatus;
   initialize the second information among the first information and the second information stored in the first memory, in response to the initialization instruction;
   notify the external apparatus of completion of initialization of the second information, upon completion of the initialization of the second information; and
   initialize the first information, the first information being initialized after a standby period after notification of the completion of initialization of the second information is sent to the external apparatus.

2. The information processing apparatus of claim 1, wherein the circuitry is further configured to:
   store the first information in a second memory, before the first information stored in the first memory is initialized; and
   notify the external apparatus of completion of initialization of the first information stored in the first memory, upon completion of the initialization of the first information.

3. The information processing apparatus of claim 1, wherein
   the circuitry is further configured to:
   initialize the first information after the standby period, in response to an operation received during the standby period at an operation device, the standby period being a time period beginning upon completion of initialization of the second information and ending upon notification of the external apparatus of the completion of the initialization.

4. The information processing apparatus of claim 3, wherein the circuitry is further configured to display, on a display, that the standby period is in progress.

5. The information processing apparatus of claim 3, wherein the circuitry is further configured to
   set a standby flag after initialization of the second information, to begin the standby period.

6. The information processing apparatus of claim 5, wherein the circuitry is further configured to
   determine whether or not notification of the external apparatus, of the completion of the initialization of the second information, has been completed; and
   reset the standby flag upon determining that notification of the external apparatus, of the completion of the initialization of the second information, has been completed, wherein the circuitry is configured to initialize the first information after the standby flag is reset.

7. An information processing method for initializing information stored in a memory including first information that enables communication with an external apparatus and second information different from the first information, the method comprising:
   receiving an initialization instruction from the external apparatus;
   initializing the second information among the first information and the second information, in response to the initialization instruction being received, the second information being different from the first information;
   notifying the external apparatus of completion of initialization of the second information, upon completion of the initializing of the second information; and
   initializing the first information, the first information being initialized after a standby period after the notifying of the external apparatus of the completion of the initializing.

8. The information processing method of claim 7, further comprising:
   storing the first information in a second memory, before the initializing of the first information stored in the first memory; and
   notifying the external apparatus of completion of the initializing of the first information stored in the first memory, upon completion of the initializing of the first information.

9. The information processing method of claim 7, further comprising:
   initializing the first information after the standby period, in response to an operation received during the standby period at an operation device, the standby period being a time period beginning upon completion of the initializing of the second information and ending upon the notifying of the external apparatus of the completion of the initializing.

10. The information processing method of claim 9, further comprising:
    displaying, on a display, that the standby period is in progress.

11. The information processing method of claim 9, further comprising:
    setting a standby flag after the initializing of the second information, to begin the standby period.

12. The information processing method of claim 11, further comprising:
    determining whether or not the notifying of the external apparatus, of the completion of the initializing of the second information, has been completed; and
    resetting the standby flag upon determining that the notifying of the external apparatus, of the completion of the initializing of the second information, has been completed, wherein the initializing of the first information begins after the resetting of the standby flag.

13. A non-transitory recording medium storing a plurality of instructions which, when executed by one or more processors, causes the processors to perform an information processing method for initializing information stored in a memory including first information that enables communication with an external apparatus and second information different from the first information, the method comprising:
    receiving an initialization instruction from an external apparatus;
    initializing second information among first information and the second information, in response to the initialization instruction being received, the second information being different from the first information;
    notifying the external apparatus of completion of initialization of the second information, upon completion of the initializing of the second information; and
    initializing the first information, the first information being initialized after a standby period after the notifying of the external apparatus of the completion of the initializing.

14. The non-transitory recording medium of claim 13, wherein the method further comprises:
    storing the first information in a second memory, before the initializing of the first information stored in the first memory; and
    notifying the external apparatus of completion of the initializing of the first information stored in the first memory, upon completion of the initializing of the first information.

15. The non-transitory recording medium of claim 13, wherein the method further comprises:
    initializing the first information after the standby period, in response to an operation received during the standby period at an operation device, the standby period being a time period beginning upon completion of the initializing of the second information and ending upon the notifying of the external apparatus of the completion of the initializing.

16. The non-transitory recording medium of claim 15, wherein the method further comprises:
    displaying, on a display, that the standby period is in progress.

17. The non-transitory recording medium of claim 15, wherein the method further comprises:
    setting a standby flag after the initializing of the second information, to begin the standby period.

18. The non-transitory recording medium of claim 17, wherein the method further comprises:
    determining whether or not the notifying of the external apparatus, of the completion of the initializing of the second information, has been completed; and
    resetting the standby flag upon determining that the notifying of the external apparatus, of the completion of the initializing of the second information, has been completed, wherein the initializing of the first information begins after the resetting of the standby flag.

* * * * *